March 8, 1966  A. H. COROMPT  3,239,080
MOVABLE CRANE DEVICE FOR VEHICLES
Filed Nov. 1, 1963  2 Sheets-Sheet 1
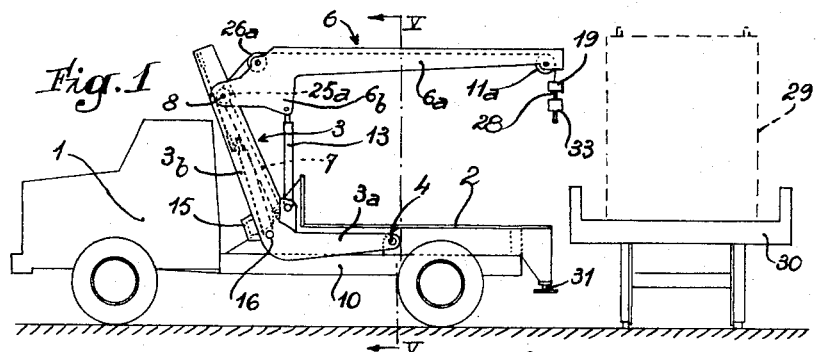
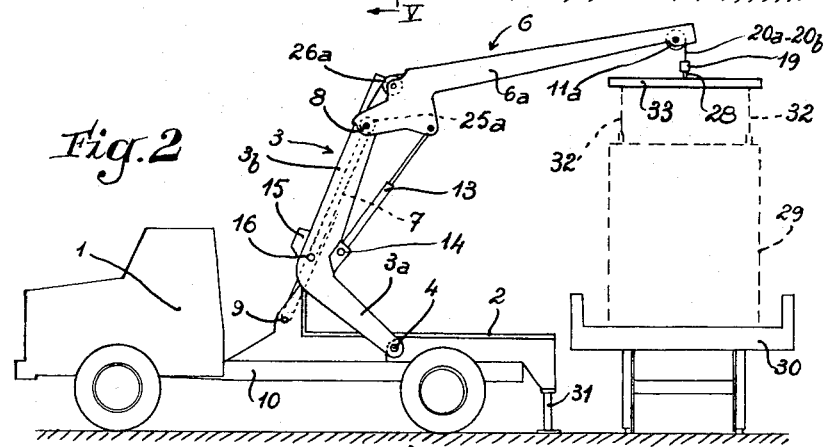
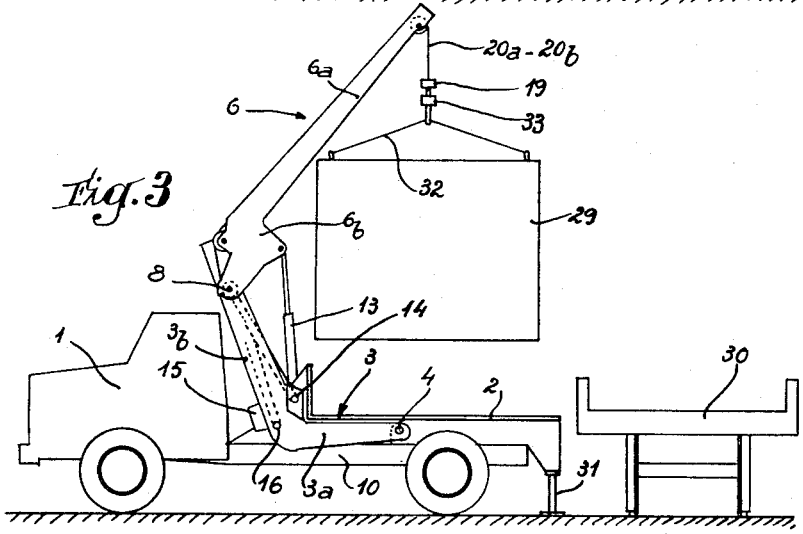
INVENTOR
Antoine Henri Corompt
BY
ATTORNEY March 8, 1966 A. H. COROMPT 3,239,080
MOVABLE CRANE DEVICE FOR VEHICLES
Filed Nov. 1, 1963 2 Sheets-Sheet 2

INVENTOR
Antoine Henri Corompt
BY Alexander Dowell
ATTORNEYS

United States Patent Office 3,239,080
Patented Mar. 8, 1966

3,239,080
MOVABLE CRANE DEVICE FOR VEHICLES
Antoine Henri Corompt, Saint-Etienne, France, assignor to Bennes Marrel, Saint-Etienne, France, a French joint-stock company
Filed Nov. 1, 1963, Ser. No. 320,750
Claims priority, application France, Feb. 13, 1963, 43,327, Patent 1,356,379
3 Claims. (Cl. 214—77)

The present invention relates generally to movable crane devices and more particularly to such devices for vehicles capable of loading a load on their own platform.

The invention aims to provide a new and improved means adapted to be associated with a vehicle in order to load on the latter bulky loads having overall dimensions close to the limits compatible with the necessities of the rule of the road.

An object of the invention is to provide a means of loading on a truck bulky loads such as containers of the kind used in the railways.

Another object of the invention is to provide a vehicle having its own autonomy for loading containers, two for example, on a trailer and one on its own platform, in order to constitute an independent road train.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is show in the accompanying drawings, forming a part of the specification:

FIGS. 1 to 4 are side views diagrammatically illustrating different phases of loading a container on a vehicle with a crane device according to the invention.

Figure 4:
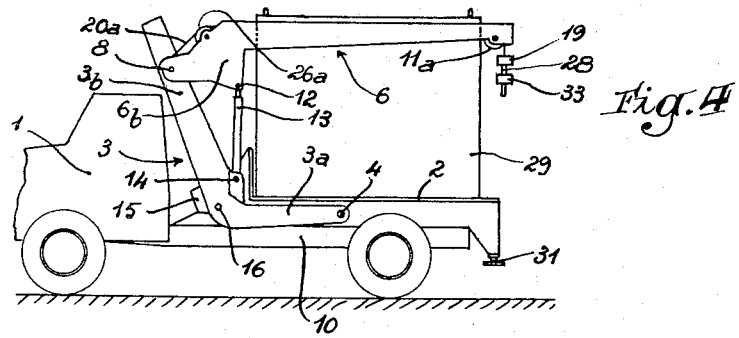

The invention is shown in FIGS. 1 to 5 in connection with a vehicle 1 having a loading platform 2. This device principally comprises a U-shaped crane frame 3, the legs of which are bent and supported by their lower portions 3a. The latter hinge at their lowermost ends on horizontal axles 4 situated on each side of the platform 2. The upper portions 3b of the U-shaped bent frame 3 pivotally carry a hoisting jib 6.

Figure 5:
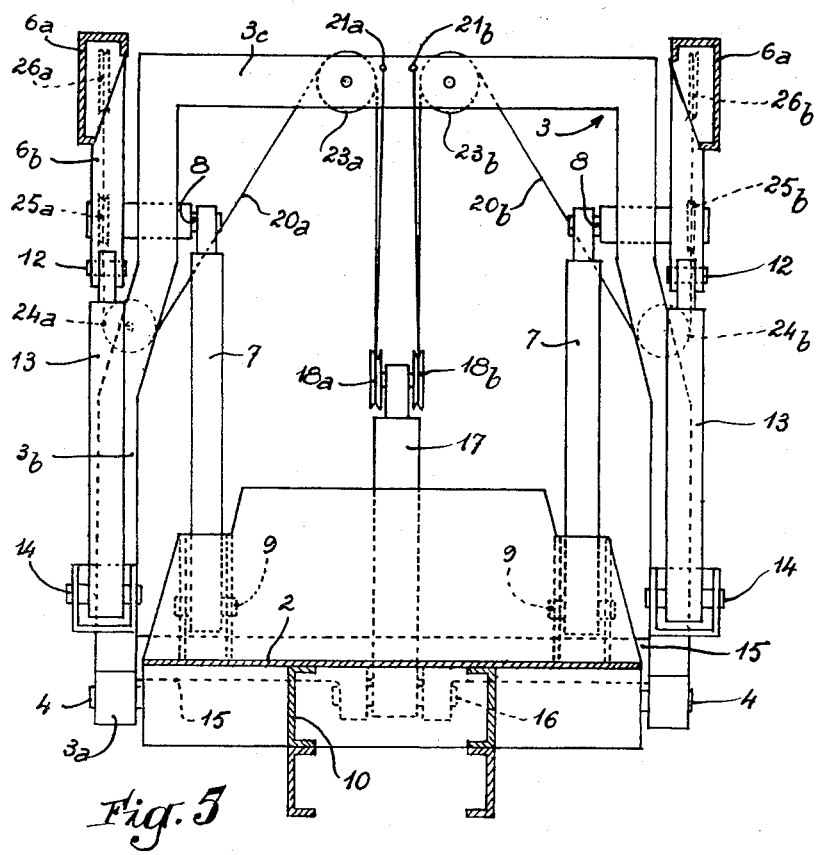
FIG. 5 is a sectional view taken on the line V—V (FIG. 1).

When the leg portions 3a of the frame 3 are horizontally directed towards the front of the vehicle, the leg portions 3b raises obliquely above the platform 2, directed towards the rear of the vehicle as they form an obtuse angle with the leg portions 3a (FIGS. 1 and 4). The frame 3 also comprises a horizontal transverse girder 3c connecting the ends of the upper leg portions 3b (FIG. 5).

The frame 3 is actuated by two double-acting hydraulic rams 7 and may tilt about the axles 4. Each ram 7 contracts or expands between two end axles 8 and 9. Each axle 8 is horizontally disposed on the corresponding upper leg portion 3b. Each axle 9 is integral with the chassis frame of the vehicle and situated ahead of the platform 2, between the latter and the vehicle cabin (FIGS. 2 and 5).

Each axle 8 extends laterally out of a corresponding leg portion 3b near the transverse girder 3c with which it is parallel. One portion of each axle 8 extends towards the interior of the frame 3 and is pivotally connected to the corresponding ram 7, as above mentioned. The other portion of each axle 8 protrudes beyond the exterior of the leg portion 3b and pivotally carries the lower end of the hoisting jib 6.

The jib 6 is shaped in the form of a substantially U-shaped structure, the bottom of which is horizontally disposed and carries at each end a loose pulley 11a (only one of them is shown in the drawings, namely pulley 11a situated on the left side of the vehicle). The extremities of the lateral legs 6a of the jib 6 hinge about the axles 8, on each side of the crane frame 3. Close to the axle 8, each of the legs 6a has a widened portion 6b (FIGS. 4 and 5) downwardly oriented and having a transverse articulation spindle 12. A double-acting hydraulic ram 13 is linked on each spindle 12 and connects the latter to another spindle 14 integral with the two corresponding leg portions 3a and 3b of the crane frame and disposed at the heel of the angle they subtend.

The crane frame 3 also comprises a second transverse girder 15 (FIGS. 4 and 5) connecting the two aforesaid crane frames at the heel of the angle they subtend. This girder 15 is parallel to the upper girder 3c and it has at its center a transversal axle 16 to which the lower end of a double acting hydraulic ram 17 is pivoted.

The other end of the ram 17 carries a transverse spindle on which are mounted two-coaxial loose pulleys 18a and 18b (FIG. 5). These pulleys permit the ram 17 to cause the up and down displacements of a pivotal hoisting unit 28 (FIG. 4) by means of two hoisting cables 20a and 20b, disposed along symmetrical ways with respect to the vertical longitudinal middle plane of the vehicle. These cables 20a and 20b are attached by their respective ends 21a and 21b to the middle portion of the girder 3c. Cable 20a then successively passes over a number of loose pulleys, which are, in order of meeting: the pulley 18a, a pulley 23a mounted on the girder 3c near the end 21a, a pulley 24a mounted on the corresponding leg portion 3b near the axle 8, a pulley 25a turning about the axle 8 and disposed inside the wider portion 6b situated on the corresponding side of the platform 2, a pulley 26a mounted on the corresponding leg portion 6a near its end, and the pulley 11a, before reaching the upper girder 19 of the pivotal hoisting unit 28 to one end of which it is secured.

Cable 20b is disposed symmetrically, along a similar way determined by pulleys 18b, 23b, 24b, 25b, 26b and 11b before reaching the other end of the girder 19 of the hoisting unit 28 to which it is secured.

The turning lower portion or girder 33 of the said pivotal hoisting unit 28 preferably has two slings 32 (FIGS. 2-3) carrying hoisting hooks of known type. It is apparent that, with such a disposition, the tensions of the cables 20a-20b are both equal to one-half of the total load hoisted by the hoisting unit 28; further, the vertical displacement amplitude of the hoisting unit 28 is twice that of the elongation amplitude of the hoisting ram 17.

The operation is as follows:

The vehicle is backed rearwardly close to a railway carriage or trailer 30 carrying a container 29 (FIG. 1), for the purpose of loading the latter on the platform 2. The soles of two hydraulic supporting jacks 31 of known type disposed at the rear of the vehicle are first brought into contact with the ground, in order to stabilize the vehicle during the transfer operation.

When rams 13 and 7 are at their maximum elongation (FIG. 2), the pulleys 11a–11b are situated at their maximum distance behind the platform 2 and above the latter. When the said pulleys 11a–11b are positioned above the container 29, the latter may be secured to the slings 32 of the hoisting unit 28.

The rams 7 are then contracted and cause a forward tilting of the provisionally undeformable assembly comprising the crane frame 3 and the jib 6, about the axles 4. During this operation, the hoisting ram 17 is slightly released, in order to slightly lower the unit 28 and to prevent the container 29 from striking against the jib 6. During this movement, the lower girder 33 carrying the container is pivoted through 90 degrees about the vertical axis of the pivotal unit 28 until the assembly comes to the position shown in FIG. 3. The container 29 is then longitudinally orientated above the vehicle and it is only necessary to completely release the hoisting ram 17 to lower the said container 29 down on the platform 2.

The rams 13 (FIG. 4) are then contracted causing the jib 6 to pivot about the axles 8 until the said U-shaped jib 6 assumes a horizontal position surrounding the upper part of the container 29.

Under these conditions, it is apparent that the height of the space necessary for the loaded vehicle is determined by the proper height of the container 29, while the overall width of the loaded vehicle is scarcely greater than the corresponding dimension of the said container 29. The latter then may have the maximum bulk dimensions compatible with the necessities of the rule of the road.

Quite obviously, the invention also concerns a vehicle where the supporting jacks 31 are replaced by any other stabilization mechanism of known type.

I claim:
1. In a movable crane device for a vehicle having a chassis and a loading platform rigidly secured thereto, the combination of articulation shafts disposed below the middle portion of the platform at each side thereof and extending on an axis disposed transversely thereof, a U-shaped crane frame disposed for movement on the longitudinal axis of the chassis and having an upper transverse girder and two L-shaped side booms hinged at their lowermost ends to said articulation shafts; a U-shaped jib having two straight side booms pivotally carried at their lower ends by the said U-shaped crane frame adjacent each end of said transverse girder; hoisting cables carried by the said jib; a hoisting unit hanging from the hoisting cables at the free end of said U-shaped jib; means for pivoting the said U-shaped jib about said U-shaped crane frame; and means for pivoting the said U-shaped crane frame independently of the said U-shaped jib pivoting means.

2. A movable crane device as claimed in claim 1, wherein the said means for pivoting the said U-shaped crane frame comprises a ram located on each side of said loading platform, each ram pivotally connecting an axle fixed to the said vehicle chassis to a horizontal axle fixed to the upper portion of a side boom of the said U-shaped crane frame.

3. A movable crane device as claimed in claim 1, wherein the said U-shaped jib pivoting means comprises a ram located on each side of the said loading platform, each of the said rams pivotally connecting a spindle fixed to an L-shaped side boom of the said U-shaped crane frame located at the heel of the angle thereof, and to another articulation spindle carried by a downwardly oriented widened portion integral with the lower end of the adjacent side boom of the said U-shaped jib.

References Cited by the Examiner

UNITED STATES PATENTS

| | | | |
|---|---|---|---|
| 2,332,962 | 10/1943 | Barrett | 214—77 X |
| 2,626,069 | 1/1953 | Jones | 214—75 X |
| 2,965,408 | 12/1960 | Edwards | 294—81 |

FOREIGN PATENTS 899,484  6/1962  Great Britain.
(Corresponding German printed application, 1,105,796, Apr. 27, 1961)

GERALD M. FORLENZA, *Primary Examiner.*

HUGO O. SCHULZ, *Examiner.*